INVENTOR.
WILLIAM J. LIEBIG
BY
Emery, Booth, Townsend, Miller + Weidner
ATTORNEYS April 11, 1961 W. J. LIEBIG 2,978,787
SYNTHETIC VASCULAR IMPLANTS AND THE MANUFACTURE THEREOF
Filed April 18, 1957 8 Sheets-Sheet 3

FIG. 8

FIG. 9
JAQUARD HOOK WITH 4-PATTERN DOUBLE-SCALE INDEX TO WARP ENDS OF EITHER SET, A OR B

INVENTOR.
WILLIAM J. LIEBIG
BY
ATTORNEYS

April 11, 1961 W. J. LIEBIG 2,978,787
SYNTHETIC VASCULAR IMPLANTS AND THE MANUFACTURE THEREOF
Filed April 18, 1957 8 Sheets-Sheet 4

INVENTOR.
WILLIAM J. LIEBIG
BY
Emery, Booth, Townsend, Miller & Weidner

ATTORNEYS

WARP

INVENTOR.
WILLIAM J. LIEBIG

FIG. 18

United States Patent Office 2,978,787
Patented Apr. 11, 1961

2,978,787

SYNTHETIC VASCULAR IMPLANTS AND THE MANUFACTURE THEREOF

William J. Liebig, Harrington Park, N.J., assignor to Meadox Medicals, Inc., Haledon, N.J., a corporation of New Jersey Filed Apr. 18, 1957, Ser. No. 653,562

24 Claims. (Cl. 28—73)

This invention concerns prosthetic devices and particularly synthetic vascular grafts or implants, and the manufacture of the same. Its several aspects include the resultant implant units themselves, the multiple-unit woven textile blanks presenting such implants, and the fabricating method and steps in the manufacture of these devices.

Advances in surgery, in some part coming out of World War II experience, have demonstrated the feasibility of replacing segments of human blood-vessels at areas of damage or failure. This has posed the problem of supplying suitable tubular elements for blood-vessel replacement in the human body, including such vital locations as in the aorta, the iliac branches and elsewhere.

Various tubular structures have been experimentally employed in animals and clinically in human beings. These have included synthetic plastic materials extruded in tubular form, found generally unsatisfactory due to lack of porosity or permeability for elements of the blood and other tissues. Textile-fabricated seamless tubes have been proposed, both of a braided and a knitted formation, and also tubes formed by folding and stitch-seaming the lapped longitudinal edges of woven fabrics. While having some utility for the implant purposes none of these have had more than indifferent results.

Under the present invention tubular synthetic vascular implants or prostheses of integrally woven fabric are accorded the appropriate tubular form in the actual weaving of the constituent fabric. Certain synthetic materials are selected for the warp and filling yarns to be woven such as to afford in conjunction with the weaving process the optimum as to strength, flexibility, elasticity and resilience, as well as a requisite limited range of porosity, permeability and compatability to tissue formation, along with capacity to be sterilized and other characteristics appropriate to successful implantation into the arterial and venous system of the human body.

From tests in animals and clinical results in human patients it appears that the new type of woven fabric tubes with integral woven-in seams of the present invention now for the first time combine the advantages of prior seamless braided or knitted tubes and those of folded and stitch-seamed woven fabric.

In the drawings illustrating by way of example certain embodiments of the invention and the methods of manufacture of the implant devices.

As noted, the overall object of the invention is to furnish approved synthetic tubular implants for use in the vascular system at the various locations where replacement of a portion of a natural artery or vein is indicated. While some efforts have been made to set up arterial banks, any supply of homografts available from such source to date has been grossly inadequate. On the other hand, such tubular elements as have been suggested for the purpose, including extruded plastic tubing, seamless braided and knitted tubing, and also tubing made from ordinary single-ply woven fabric cut to appropriate width, folded centrally and then provided with a sewed seam along the disjoint lapped edges, have met with difficulties in use.

Each of these has been found lacking in one or another characteristic essential to performance requirements in the human system. These include a certain porosity or permeability to the fibroblasts and collagens which normally develop along a vascular implantation. Other requirements are a relatively thin wall, of the order of .005 to .008 in., that is approximately that of the average wall of the natural human blood vessel of the given diameter, combined with adequate strength along with flexibility and resiliency, both for the tube as a whole and for the constituent wall, to withstand the body stresses, importantly including the arterial pulsation.

In any instance the material must be compatible with the human tissues and capable of sterilization preferably under ordinary steam heat and pressure autoclaving treatment. Extruded plastic tubing has lacked porosity and attempts at deliberately perforating it have proved unsuccessful. Both braided and knitted seamless tubings while appropriately flexible have proved too highly porous or else are objectionable for too great wall thickness and general irregularity of surface. Further, the relatively marked looping or knotting of the constituent strands in seamless textile fabrication such as knitting and to a lesser extent braiding tends to weaken the component strands and leads to early breakdown of the tubing wall in use. Woven fabric made into tubular form by folding and stitching together the lapped longitudinal edges by a sewed seam, while better in some respects, have proved subject to undue leakage and structural weakness along the lines of such sewed seams and have been incapable of satisfactory bifurcation.

In accordance with the invention synthetic vascular implants are directly produced in tubular form inherently in the fabrication of the cloth itself. This is accomplished by simultaneously weaving a plurality of at least two fabric plies, with the superposed plies forming the opposed walls of a flat tube in the fabric web or blank. At appropriate locations corresponding to the desired width for the tube the two plies are integrally united in the course of the weaving operation and in such manner as to form an in-woven seam or line of union. As the woven web comes from the loom it presents a multiplicity of flat tubular blanks contained in a continuous double-ply fabric or fabric blank and from which the individual vascular implants, or lengths of implant tubing, are cut out and finished as manufactured products ready for hospital use.

Figure 1:
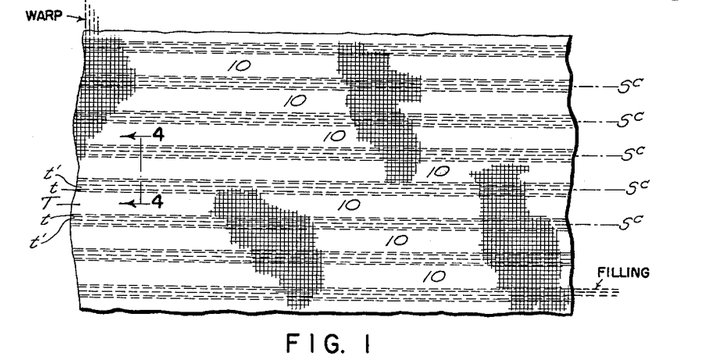
Fig. 1 shows a portion of a woven fabric blank presenting a number of implant devices of straight linear form disposed side by side in the blank.
Figure 2:
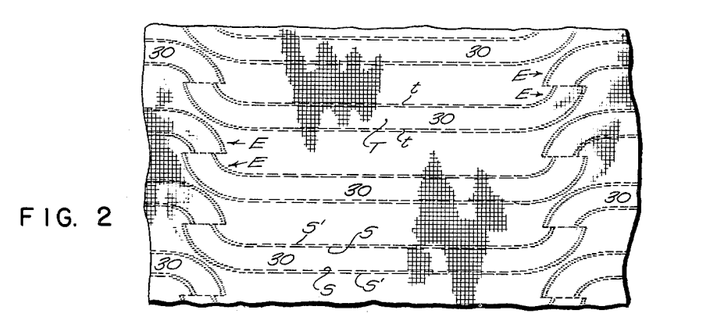
Fig. 2 illustrates a similar woven fabric blank portion presenting a multiplicity of implant units of bypass, offset or shunt form.
Figure 3:
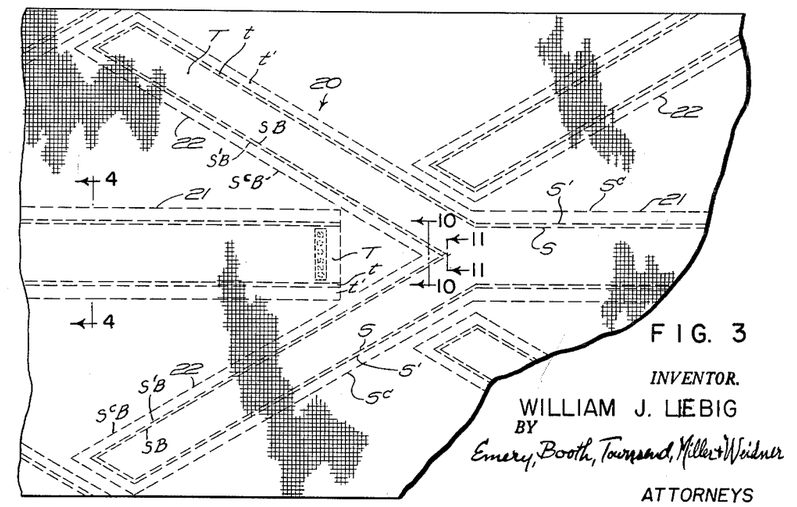
Fig. 3 again shows a woven fabric blank portion containing a number of implants of an important special bifurcated form.
Figures 4, 5, 6, 7:
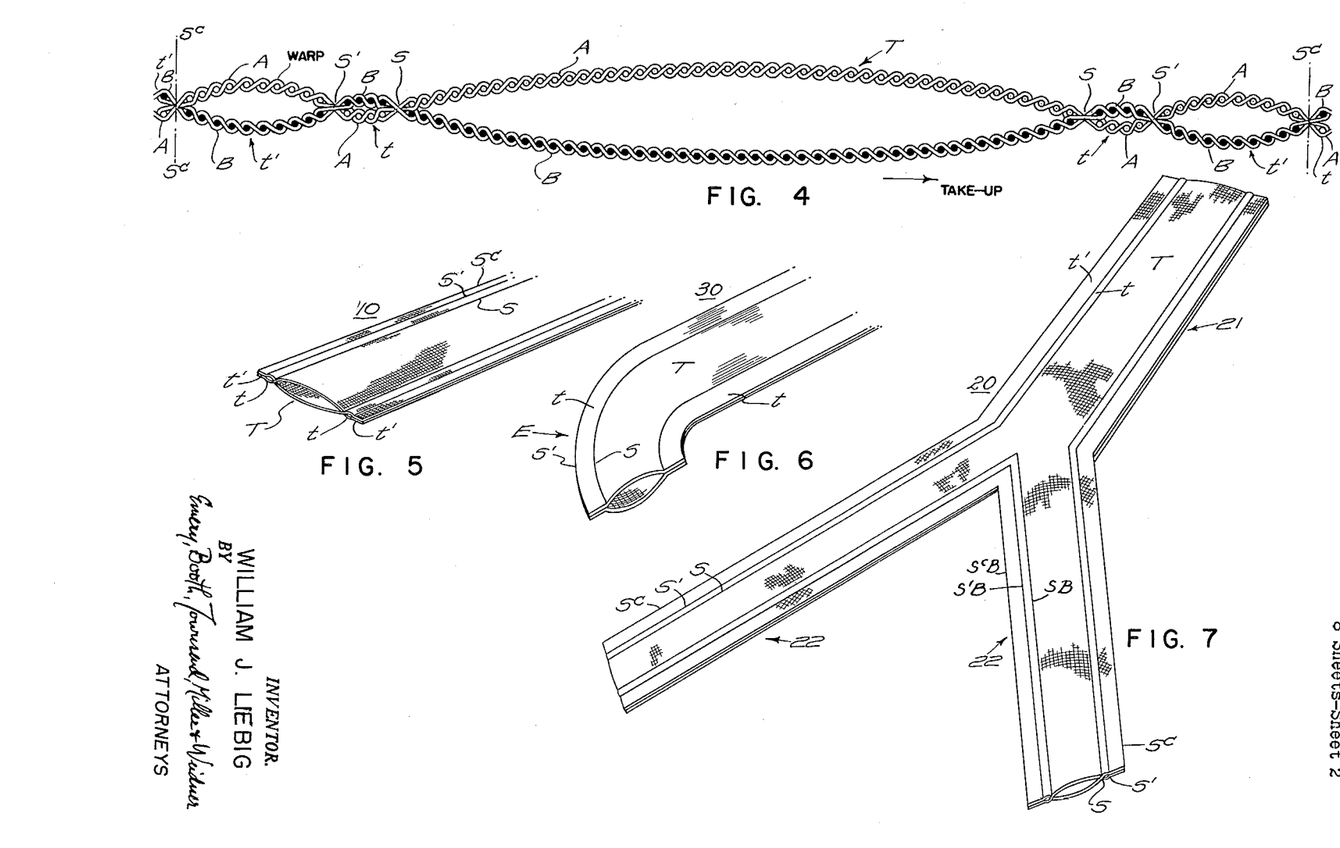
Fig. 4 is a diagrammatic cross-sectional enlargement taken lengthwise of the warp through an implant typical of the invention, as on lines 4—4 of Fig. 1 and of Fig. 3.
Fig. 5 is a perspective view of an end portion of a straight implant corresponding to that of Fig. 1.
Fig. 6 is a perspective view of an end portion of a curved or shunt type implant corresponding to that of Fig. 2.
Fig. 7 shows in perspective the entirety of one Y-form implant such as that of Fig. 3.

Further in accordance with the invention, such implant tubing elements may be of a continuous straight conformation as for example in Figs. 1 and 5, or they may present various combinations of straight line and deflected portions, such for example as in the laterally offset, shunt, or by-pass form of unit illustrated in Figs. 2 and 6, and the important bifurcate or Y-form such as that of Figs. 3 and 7 for replacement for example of the large abdominal aorta and its division into the iliac limbs. Heretofore no satisfactory bifurcate synthetic vascular implant has been available due to the extreme difficulty of providing suitable wall union in the crotch area and particularly at the point of the Y.

Factors contributing to the invention include not only the fabric structure and manner of weaving dual webs or plies integrally joined into tubular form along woven-in seams or union zones but also include the determination and selection of suitable component materials to be woven. It is known that certain of the synthetic materials have good human tissue compatability along with wettability for blood so as to promote the starting of clotting and the attendant growth of a layer of collagen on the wall of prosthetic tubing after implantation. Other synthetics are quite the reverse in said respects.

Other important considerations in the selection of the materials of the warp and filling yearns to be woven are strength, flexibility and resilience, both for the woven components themselves as well as for the resultant tubular units, together with capacity to withstand sterilization and also to have an appropriate water-absorption. Some or a majority of these characteristics are found in a number of the commercially available synthetic fibers, including the long-chain polyamide type of the nylon class, those of the tetrafluoroethylene type known under the trademark Teflon, also the type commercially designated as Orlon, and especially those composed of terephthalic acid-ethylene glycol ester as commercially produced by Du Pont de Nemours Co. under the trademark Dacron. Of these nylon, Dacron and Orlon are stable to about 450° F., making it possible to autoclave these materials for sterilization without objectionable modifications such as stiffening, shrinkage or loss of strength. Other synthetic materials as for example Vinyon-N undergo significant changes if exposed to sterilizing heat.

From long experimentation it has further been determined that a multi-filament yarn gives greatly superior results in implantation use over a solid or uni-filament strand. That experience to date indicates a general necessity of a multi-filament yarn for the purposes here concerned.

In the preferred example as herein illustrated the weaving is accomplished with a 34-filament Dacron yarn of approximately 70 denier such for example as that known commercially as Du Pont Type 5600. As to luster this yarn must be termed "semi-dull." The small size of this yarn made up of some 34 individual filaments of the Dacron fibre will be appreciated from consideration that the denier number expressive of the size is derived as the weight of 9000 meters of the yarn measured in grams. The reason for the superiority of such multi-filament synthetic yarn for the instant use appears to lie in the inherent resilience in the yarn itself, as contrasted with the relative hardness of any known solid or single strand of like diameter, together with the capacity of the multi-filament yarn to promote the formation of collagen apparently by the ability of the latter and the fibroblasts to permeate between the filaments of the yarn itself as well as to penetrate in the closely restricted interstices between yarns in the finely woven fabric of the invention.

The preferred Dacron multi-filament yarn is received from the manufacturer with zero twist. In preparation for the weaving, and as to both the warp ends and the filling, the yarn desirably is given a relatively soft twist as for example about a 9 to 12 turn left or Z-twist. Such twist additionally strengthens the yarn for the weaving operation, enabling it better to resist marring in contact with mechanical elements of the loom, especially those of the stop motion, the heddles and the reed. For similar reasons and also for some lubrication, the yarn may also be given a sizing treatment with a sizing which is soluble in lukewarm water. Alternatively the yarn may be submitted to a siliconizing treatment. Satisfactory results with the stated Dacron yarn have been obtained however without sizing or other coating or impregnation.

Coming now to the fabrication of the selected fine multi-filament synthetic yarn into the tube-presenting double-ply fabric blanks. It should be pointed out first that the fabric although required to have that porosity, permeability or capacity to "breathe" as previously mentioned, must nevertheless be of such fineness or closeness and density of texture, as contrasted with what would be regarded as porosity in the ordinary run of fabrics, as to enable a woven tube thereof to be inflated under air pressure.

Permeability or porosity as herein referred to with respect to the fabric is represented by the number of cubic feet of air which will pass through a square foot of fabric per minute at a pressure of 1.26 in. of water. While some range in fabric porosity is permissible, it has been found that a porosity value in the vicinity of 20 is the optimum for vascular implant purposes. With a fabric of a porosity of less than 16 only a slow or difficult sweating of blood through the cloth is had. On the other hand such a relatively high porosity as 45 as represented by a fabric having a thread count of as low as 116 x 96 per inch is found to be subject to objectionably rapid bleeding, making it necessary to pre-clot the fabric before implantation particularly if the graft is of relatively large diameter such as for the aorta.

In the practice of the invention, wherein the porosity of the fabric is a function both of the size and of the multi-filament nature of the yarns as well as of the close proximity of the yarns as laid in the weaving operation, an extremely close or dense weave of the selected yarns is needed for the relatively low order of porosity here concerned, desirably not less than 16 nor greater than about 25 to 30. Utilizing for example the 70 denier 34-filament Dacron yarn of the preferred example, each cloth or ply of the dual layer fabric should have an approximate count of 150 warp ends by 100 filling picks per inch. Accordingly the loom is set up to weave in the two cloth or plies a total of 300 ends by 200 picks per inch.

In actual practice this is accomplished for example upon a standard 4 by 4 Crompton and Knowles loom, modified to afford the appropriate warp tension both in front of the lay and in back of the hand rail, and also correct tension fillingwise at the temples. The loom is equipped with a Jacquard mechanism or head, preferably with a double-scale fine index. By appropriate special preparation of the Jacquard mechanism, by which each individual warp end or at least adjacent pairs of ends are separately and individually controllable in the shed formation, a dual-ply fabric is produced wherein the two plies are at certain times integrally joined along lines either paralleling or inclined to the filling path. Under the Jacquard control these lines or woven-in seams are ordered so as to define in the resultant web or two-ply cloth blank the tubular formations of the desired longitudinal contour and required diameter, as represented by the straight and the other tubing forms herein illustrated by way of example in Figs. 1 to 3 and 5 to 7.

Thus the invention avails of the capacity of the loom as equipped with Jacquard mechanism to fabricate a dual web or two-ply fabric having a high count of fine-denier synthetic yarns and in which the two plies are caused to unite recurrently at determined intervals in woven-in seams or lines of union located to define the opposed longitudinal margins of flat tubes, in the fabric as woven.

These inwoven-seams integrally joining the two fabric plies are spaced according to the desired width (flat diameter) of the tube. They extend generally in the direction of the filling yarns. For straight tubes these seam unions parallel the filling, continuously along a given pick line, normal to the warp. For tubes having axes along other than a uni-directional straight line, as in the offset or shunt form of Fig. 2, or the bifurcated or Y-form of Fig. 3, the inwoven seams have arcuate or angular portions other than normal to the warp and are defined by minutely stepped portions of different successive filling picks echelon-fashion across the warp. In either instance the woven-in seams or tube-margin union lines comprise also the portions of the warp ends with which they are interwoven, thus further contrasted with an ordinary sewed seam made by merely stitching together two superposed fabric layers.

By way of specific example, but without limitation thereto, the Jacquard-equipped loom in one case of actual practice is set up to weave a 50 in. web incorporating a sheet of 15360 warp ends. Under control of the Jacquard means this entire sheet of warp ends is in effect divided into, or for shedding purposes handled as, two distinct sets of warps. The component yarns of each are preferably the same, all of them being for example the 70 denier 34-filament Dacron yarn of the preferred example. But in the Jacquard weaving the two warp sets are handled throughout the tubular portions of the web in such separate manner, by the appropriate Jacquard-controlled shedding, that two distinct plies or cloths are simultaneously woven at all areas except where the two plies are to be united along the mentioned woven-in seams or union zones. At one time the filling is picked across through a shed formed solely of one warp set and at another time solely through the other warp set. This may be at every other pick, or at every other pair of picks, or otherwise.

While the two warp sets may be and preferably are identical, each being constituted by every other warp end across the entire warp sheet, they may for convenience be referred to as the face or top warp set A and the back or bottom warp set B.

For simplicity and also maximum uniformity of resultant surface texture, the particular weave employed as to both warp sets is in the illustrated example a plain or so-called taffeta weave, the filling being alternately over and under every alternate end of the given warp set.

Thus in each of the two plies or cloths, each constituting one wall of the flat tubular blank being woven, one or more picks are first inserted only in a shedded warp set A and then a like number of picks are inserted only in the shedded warp set B. Each successive pick may cross in one warp set and return in the other, or two or more picks may be inserted in one warp set and then the like number in the other warp set. No warp ends of the B set are active in shed formation when filling is being woven into warp set A; and likewise no warp ends of set A are active shedding-wise when filling is being inserted into warp set B. This results in the formation of the two distinct superposed tubing-wall plies. Across the main width of the entire warp sheet the filling in one warp set has no interweaving with the warp ends of the other set, except that at the lateral margins of the total warp sheet the woven web or fabric blank may be finished off in any convenient selvage formation to facilitate handling.

Figure 14:
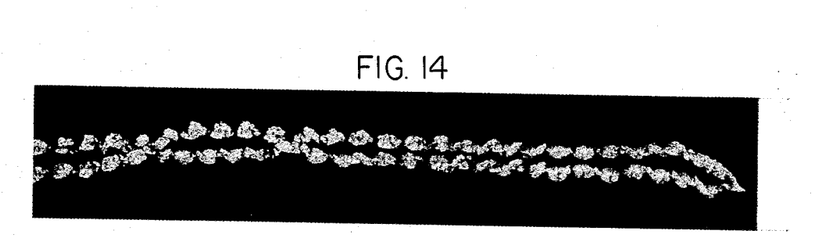
Fig. 14 is a photomicrograph magnified approximately 30× of an end or cross-section of an implant unit, corresponding to a major part of that diagrammed in Fig. 4.

At certain times in the course of the two-ply weaving, as determined by the desired width or flat-diameter for the particular tubing elements under fabrication, the two plies are caused to unit at tube-forming ply-connecting woven-in seams or tube-defining zones of union. The weaving steps involved in such seam fabrication are best apparent from a consideration first of those tubing elements of the continuous straight form as illustrated in Figs. 1 and 5, with reference also to the warp shedding diagram of Fig. 8; also to the enlarged sectional diagram of Fig. 4 taken lengthwise of the warp, and to the generally corresponding photomicrograph Fig. 14.

Figures 8, 9, 10:
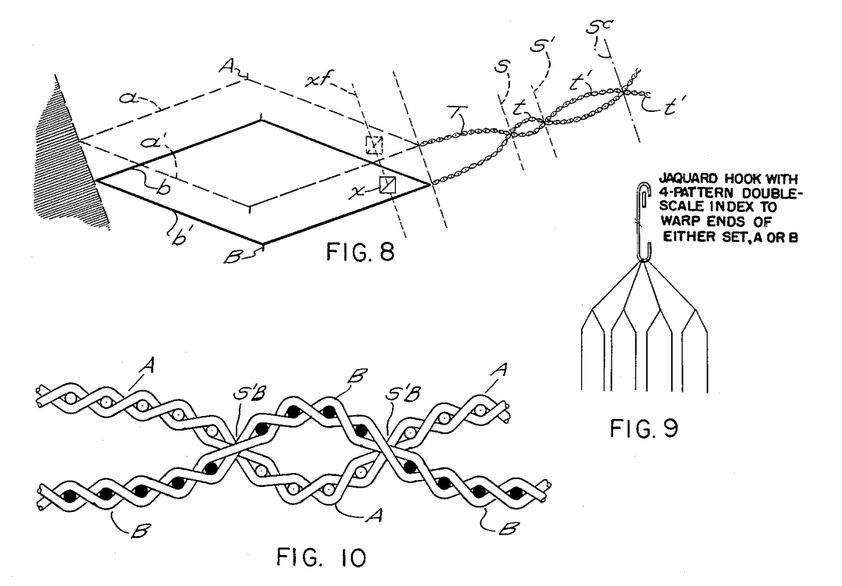
Fig. 8 is a schematic diagram illustrating the manner of Jacquard warp manipulation in the two-ply tubular weaving involved.
Fig. 9 diagrams a Jacquard shedding control element.
Fig. 10 is a diagrammatic cross-sectional enlargement approximately as upon the line 10—10 of Fig. 3.

In Fig. 8 the two warp sets are represented respectively at A and B including an adjoining pair of warp ends $a$ and $a'$ for set A and a pair of warp ends $b$ and $b'$ for set B. To distinguish them graphically set A is in broken line and set B in full line in Fig. 8, while in Fig. 4 the two sets are distinguished by showing the filling of one of them in solid black, namely set B. For descriptive purposes one set, namely set A, is herein termed the face or top warp and the other, set B, the back or bottom warp. For similar reasons the face warp A will be referred to as having an "upper" position and the back warp B a "lower" position.

In connection with the diagramming and description it is to be borne in mind that in preferred practice all the warp ends are uniform and likewise all the filling, and that the same yarns preferably are employed both in the warp and the filling. Thus the two sides of the woven web are or may be identical. Also, the two warp sets interchange positions attendant on the seam formation. Hence the terms "face," "back," "top," "bottom," "upper," "lower" are relative rather than absolute, by way of differentiating the two warp sets in the weaving operations. Nor are such terms as "upper" and "lower" intended to imply that when inactive or in a closed shed position the two warp sets are necessarily at different levels. Instead they designate shedding control positions for each warp set such that at selected times one set may in effect be "crossed-over" or interchanged in the vertical plane with respect to the other, making "face" warp act as "back" warp, and vice versa, until such time as a reverse cross-over is called for. Accordingly the terms quoted above do not imply any restriction as to the character of shed formation similarly employed in and for each of the warp sets; the particular style of shedding may be as convenient for the given loom, whether open, close, split or compound, as available under the Jacquard control utilized thereon.

In Fig. 8 both warp sets A and B are for clearness diagrammed as though in a condition of open shed for the reception of the shuttle $x$. Such positions are not simultaneous but successive. This is indicated by showing the shuttle position $x$ in full line in warp set B and in dotted line in warp set A. It is noted also that the diagram is partly in perspective, the dotted line $xf$ of shuttle flight across the lay being inclined to the observer. Said line indicates that the shuttle path is at the same level in whichever warp set is being woven into at the given moment, and is dotted to denote that only one warp set receives filling at any given pick.

Assume now that the weaving has progressed so that the two cloth plies have obtained a tubing width, warpwise, appropriate for the flat diameter of the particular tubular implant under fabrication. It is now desired to weave-in a seam or union zone thereby to unite the two plies into tubular form. A number of such seams are designated at S, S, S', S' and S$^c$, S$^c$ on Figs. 8 and 4.

The integral unions of the plies are accomplished by causing the respective warp sets to "cross-over," as mentioned. Under the control of the Jacquard mechanism the two warp sets are in effect interchanged in operation. That is, Jacquard-connected heddles and lifter cords of all warp ends of each warp set are caused to reverse as to operative position—considering here the straight tubes of Figs. 1 and 5; for other forms the cross-over action is applied at certain points to less than all warp ends in each set, as will be described.

At a warp cross-over, in the terms of the diagrammatic Fig. 8, and apparent also in Fig. 4, the warp set A for example formerly in "upper" position as the face warp, is interchanged with all the warp ends of set B, shifting from the "upper" or face warp position to "lower" or back warp position. At the same time warp set B is similarly but oppositely manipulated to become temporarily the face warp. In then continuing the weaving the two warp sets are still each handled as distinct sets, each with the appropriate shedding of its ends so as to continue the formation of the two fabric plies of the plain or other selected weave, but with the two plies in just the reverse superposition with respect to each other.

The foregoing has considered mainly the "regular" or continuous straight tubing form such as that of Figs. 1 and 5. In such instance the seam-forming cross-over action of the warp sets occurs along the same filling line across the entire sheet of warp ends. By reference particularly to Fig. 4 it is seen that these warp-cross-over formations constitute structural unions of the two plies. The warp ends of one set are in effect interlocked crosswise with those of the other set in the general manner of an X. Immediately thereafter the weaving of the filling into the two warp sets continues but with the two plies in reverse superpositon. In each zone of structural union of the plies at woven-in seams thus formed the overall fabric has a similar or even greater density as in the tube walls defined by the individual plies. The over-crossing pairs of warp ends at the X formations close and unite the material along these union zones or woven-in seams, effectively sealing the tubing wall thereat so as to leave no more interstitial spacing than elsewhere in the woven plies of the tubing wall.

For further assured strength and closure lengthwise the tubing formations, it is preferred to provide a double seam or union line, that is, two woven-in seams in relatively close parallel proximity, along the two opposite longitudinal edges of each initially flat woven tube T. This is accomplished by continuing the weaving operation, after a first warp cross-over at the edge of a main tube section T, through a few picks corresponding in number to the desired close spacing between the seams. Then the warps are caused to recross, forming another seam by thus again reversing the respective warp sets, bringing them to the former relation with set A at the face and set B at the back in the descriptive example.

Such plural seaming for the tubes T is readily apparent by reference more particularly to Fig. 4. Assume that the direction of take-up of the web is toward the right in Fig. 4, as indicated by the arrow. That is, the weaving started at the right of Fig. 4, the fell of the goods being at the left, the entire sheet of warp ends being let off and the woven web taken up in the direction toward the right as the weaving proceeds. Assume further that the particular woven-in seam at the first cross-over recently above mentioned is that indicated at S at the left in Fig. 4, here taken as representing the woven tubing blank of Fig. 1.

Immediately after said seam S weaving was carried through four picks in each of the warp sets, with the set B then at the upper or face position and set A at the back or lower position. Then the warp sets were recrossed to form the X-like uniting seam as indicated at S'. This restores the warp set A to the face position and warp set B to that at the back.

After fabrication of the multiple tube-presenting woven blanks such as those of Figs. 1 to 3, the individual tubular formations are divided from each other in a manner to be described. The corresponding forms of end products, the vascular implant devices themselves, are shown separately in Figs. 5, 6 and 7. For so processing the implants it is desirable to provide for a definite line of severance. And for best sealing purposes, in a manner also to be described, the cut lines of severance desirably are located substantially at or along a seam formation. Such cut-off and seal is located laterally beyond the first seam adjacent a main tubular formation, such as S, S, Fig. 4, and preferably is at or beyond at least a second seam, such as S', S', of Fig. 4.

In the preferred example illustrated, referring now particularly to Fig. 1 as well as Fig. 4, the woven plies are further extended between the main tubes T and the cut-offs thereof. The severance lines, which are also seams, are indicated by the dash and dot lines S$^c$ in said figures. Considering again the left portion of Fig. 4, after a second seam S', at which in the diagram the respective warp sets have resumed their positional relation with A at the face and B at the back, the weaving is continued desirably through a somewhat greater number of picks than between first and second seams S and S'. Ten picks in each warp set are shown in the particular example. Thereupon another cross-over of the warp sets is formed. The resultant seam, designated by the dot-dash line S$^c$ affords demarcation of the severance line.

Considering now the diagram Fig. 4 as a whole, it is evident that the length of woven web there shown includes a full cycle of Jacquard shedding operations. In Fig. 1 a succession of such weaving cycles is represented. Proceeding from right to left in Fig. 4 there is presented between the right-hand cut-line S$^c$ and the next following seam S' a small tubular section of intermediate width designated $t'$ then between seams S' and S a still smaller tubular section or inter-seam zone $t$. Then follows the main tubular section T, the inner wall surface of which is to define the actual lumen of the vascular implant. Continuing to the left in Fig 4 there follows in reverse order a cross-over and seam S, a small tubular inter-seam zone $t$, another cross-over and seam S' and then another intermediate-width inter-seam zone $t'$ leading to the final or cycle-ending seam and cut-off line S$^c$.

In this particular cycle the weaving affords a main tube section T bounded at the respective longitudinal edges by short inter-seam zones $t$, each next adjacent the main tube, and then at the distal side of each zone $t$ a somewhat wider inter-seam zone $t'$. Since this cycle involves an odd number of cross-overs the warp sets begin the next shedding cycle, such as after the seam-and-cut line S$^c$ at the left in Fig. 4, with the respective warp sets in the reverse position from that which they occupied at the start of the preceding cycle, this being immaterial since all the warps and all the fillings preferably are the same.

Looking now at Fig. 1 wherein the portion of woven web or tubing blank illustrated comprises seven successive complete shedding cycles, it will be seen that each tubular implant unit 10 comprises a main flat tubular section T bounded at each side by two narrow woven sections $t$ and $t'$, each of which is itself a small flat tube. It is further noted that there is but a single severance line $S^c$ between and common to each two adjoining implant units 10. Hence there is no scrap or waste material whatsoever between successive units. Moreover, and referring now more particularly to Fig. 5 showing one straight implant unit 10 separately, that the main tube of each such unit is laterally bounded by two uncut lines of seaming union S,S in turn bounded by the preferably somewhat wider fabric zones $t'$ of which the outer or cut-off margins $S^c$, $S^c$ are themselves heat-sealed by a self-welding or fusing action attendant on the severance of the given unit in the manner to be described. Thus each implant unit 10 has formed along diametrically opposite longitudinal edge portions an integral plural-seamed and marginally sealed continuous fin or reinforcing rib. This structure not only lends overall strength to the implant while preserving flexibility but also importantly aids in maintenance of the desired general alignment of the vascular prosthesis after implantation into the body.

The preceding description of the weaving process applies basically to the various forms of tubular implants available under the invention. For convenience the detailed description to this point has been illustrated largely by reference to the straight-line tubular implants 10 of Figs. 1 and 5. In the blank status thereof as in Fig. 1 these straight forms 10 may individually be continuous across the full width of the sharp sheet, or at least to the selvages thereof. After removal of the web blank from the loom these straight units 10 may be divided, finished and supplied in such continuous or indeterminate lengths. This permits any requisite length of vascular implant for a particular operation to be cut from the initial longer lengths in the operating room. Or the implant units may be supplied in various pre-cut shorter lengths in readiness for implantation as needed, as for example 15 cm., 30 cm. and others. Also under the invention the vascular implants of whatever form may be fabricated and supplied in oppropriate diameters to suit that of the blood-vessel section to be replaced. Examples in actual practice are 7 mm., 8 mm. and other sizes, these values referring to the diameter of the lumen of the inflated implant.

Thus an important advantage under the invention and the methods thereof lies in the ability to provide vascular implants of substantially any size, form and contour as appropriatae for prosthetic use in the human vasculatory system. Two further examples are herein illustrated, including the offset or shunt form 30 of Figs. 2 and 6, for use where a portion of a blood vessel is to be by-passed; and the bifurcate or Y-form 20 of Figs. 3, 7 and the others to be referred to. Such Y-form implants or bifurcations 20 are for implantation at locations where a blood vessel branches, perhaps most importantly in the lower aorta.

Since the main trunk or stem 21 of the Y-form implants 20 may be generally similar as already described in connection with the straight forms 10 of Figs. 1 and 5, such bifurcate form is now here described. Noting Figs. 3 and 7, the fabrication at any cross-section along the trunk or stem 21 may be substantially that as illustrtated in the diagrammatic Fig. 4 and in connection with the shedding diagram of Fig. 8, including the several cross-overs or seams S, S' and the cut-and-seal seams $S^c$. Similar reference characters on Fig. 7 accordingly represent similar parts and formations as in Figs. 4 and 5 and need not be further detailed.

Each bifurcate implant 20 further comprises a pair of legs, each indicated as a whole at 22, 22. These branch from an end of the stem 21 and in each of them the general lineation and arrangement of the seams S, S' and $S^c$ extending from the stem and of the branch seams SB, S'B and $S^cB$ are continued.

Figures 11, 12:
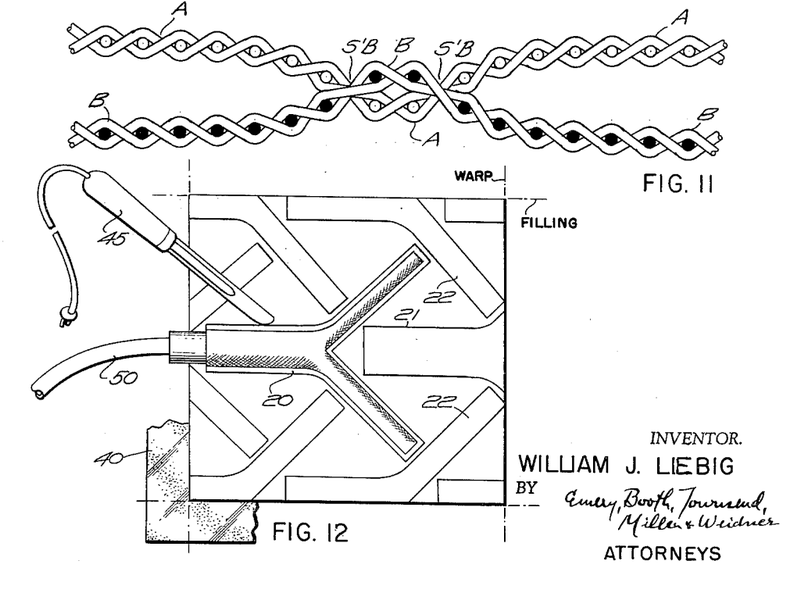
Fig. 11 is a similar fabric diagram as at a point of directional change or discontinuance of a woven-in seam line as for example at the point of a Y-unit, substantially as on the line 11—11 of Fig. 3.
Fig. 12 shows diagrammatically and upon a smaller scale than in Fig. 3 one complete pattern unit of a repeat-pattern web or blank and illustrating other steps in the production of the individual tubing units.

As to the position of the Y-forms 20 in the web blank of Fig. 7, also in the repeat pattern diagram of Fig. 12, it is evident that the stem portions 21, similarly as the entirety of the straight implants 10, extend across the web, fillingwise. The legs 22, however, have their axes and longitudinal margins disposed angularly with respect both to the filling and to the warp ends. Since the angularity of the legs 22 relative to the stem 21 generally does not exceed but is somewhat less than 45°, as in the human vasculatory system, the legs may be regarded as lying in the general direction of the filling.

The angularly extending seam-formations of the legs 22 are comprised by portions of different filling picks, rather than by the same one or a few picks as in the straight tubing 10 and in the stem 21 of the Y-forms 20. This is effected by causing the previously described cross-overs of the two warp sets such as A and B to take place with respect to but one or a few of the warp ends at the given time, and by shifting the location of such cross-overs in the fillingwise direction for each pick or a small number of picks in each of the two warp sets. As such cross-over locations shift fillingwise they also depart incrementally from the line of the axis of the implant stem 21, in one of the legs 22, and approach said axis in the other leg 22, depending on which side of the stem, in the direction warpwise, the particular leg is located.

Thus in effect the diagonal seam lines of the legs 22 are defined by a multiplicity of relatively short sections of filling staggered in minutely spaced relation in succeeding fillings or small groups of fillings. This weave structure is indicated schematically in connection with the shunt-form implants 30 of Fig. 2 wherein the seam lines at times assume a steeper pitch relative to the main axis of the implant than in the instances of the Y-forms 20. It is impractical so to diagram these progressive diagonally shifting cross-overs in Fig. 3 but the diagonal seam lines therein will be understood as so constituted. The weaving procedure concerned will be apparent from a consideration of Figs. 10 and 11 having to do with the weave structure at an area where a seam changes in angle, as at the joinder point of the Y. The described weaving procedure will be apparent to those skilled in the weaving art and from the consideration that through the medium of the Jacquard mechanism applied to the loom each individual warp end of the entire sheet, although it may contain as many as 14,000 to 16,000 warp ends for a 50 in. web, is independently controllable as to each shedding operation for each pick.

Looking now at said diagrammatic Figs. 10 and 11, these represent short sections taken for example as if at lines 10—10 and 11—11 on Fig. 3, the sections running warpwise of the two-ply cloth. They illustrate the woven structure at two closely spaced warp locations along the same group of filling picks in the region of the very point of a bifurcation 20 at the base of the Y.

At the particular warp location of Fig. 10 two of the seam lines of the legs 22, say the inner seams SB, SB have progressed angularly toward each other and symmetrically toward the axis of the stem 20 until almost at the extreme point of joinder. There are but four filling picks per warp set between the two cross-overs of the warp sets A and B which define said seams. Then moving a very short distance across the cloth, fillingwise, toward the right in Fig. 3, the seams SB, SB in Fig. 11, come virtually together, with but two filling picks per warp set contained in them. As soon as one cross-over has been completed, say of warp set B from back to face position, then at the next filling pick the reverse cross-over begins, returning warp set B to back position, and vice versa as to warp set A. This produces at the extreme point of the Y a closed fabric structure of equal density with that at all other fabric areas. Any undesired leakage at the bifurcation point and adjacent region, which has posed hitherto unsolved problems in vascular implants, accordingly is prevented.

The illustrated positive interlocking both of warps and of fillings is thus clearly demonstrated, as to the very point of the bifurcation in Fig. 11, and as to the locations close to and beyond the bifurcation point, in Fig. 10. The same weaving procedure progresses, reading for example from right to left on Fig. 3 until the full angle taken by the legs 22, 22 is formed. Particularly note shuld be made of the definiteness of the point formation and also the exact angle formed under the method and structure of the invention. This last-mentioned consideration is of special importance, since in a bifurcate implant such as 20 the leg angle should be closely conformant to that of the bifurcate blood-vessel being replaced. Under the Jacquard weaving control the exact angle desired for the Y-form unit can be provided by appropriately adjusting the length of filling and number of warps between successive warp crossovers, in the direction fillingwise; the length of filling in each staggered step of the seam lines is varied with the degree of inclination desired, becoming longer as the inclination decreases, and shorter as the desired inclination steepens. This is further apparent in the shunt-form implants of Fig. 2 in which the pitch of the seams at the tubing unit ends varies from parallelism with the fillings to near normality thereto at the extreme ends, while the tubing diameter is held uniform throughout.

Otherwise stated, noting again Fig. 3 and Figs. 10, 11, the locations in the fabric as represented by said Figs. 10 and 11 may be as closely adjacent as in adjoining warp ends in the direction fillingwise across the warp sets, or may be spaced fillingwise by any selected number of warp ends, according to the configuration and angularity desired for the particular implant. Reading from the bifurcation point, at section line 11—11 on Fig. 3, toward the right, the seam lines SB, SB beyond the point leave off completely along the axis of the stem 21, and the lumens of the legs 22, 22 open uninterruptedly to and from the stem lumen. The resulting smooth inner wall formation in this crotch area or region of bifurcation as well as elsewhere throughout the tubing lumens is particularly notable.

Figure 15:
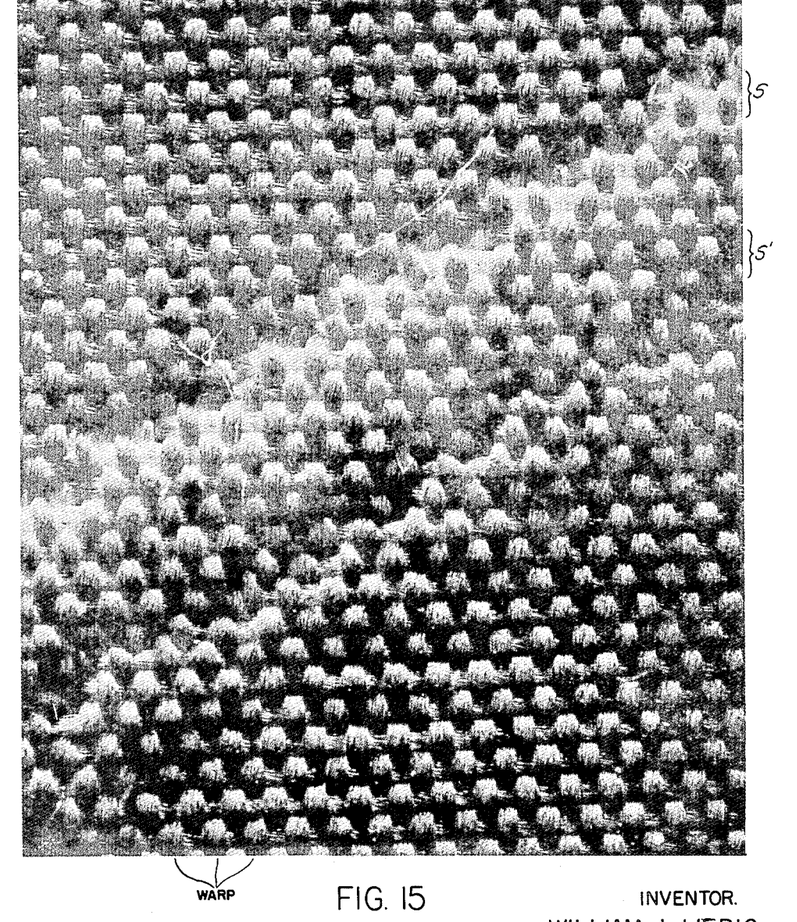
Fig. 15 is a photomicrograph magnified approximately 30×, taken in reflected light, of an area of an implant including portions of two parallel woven-in seam lines inclined to the filling direction as for example in a leg of a Y-form implant of Figs. 3 and 7.
Figure 16:
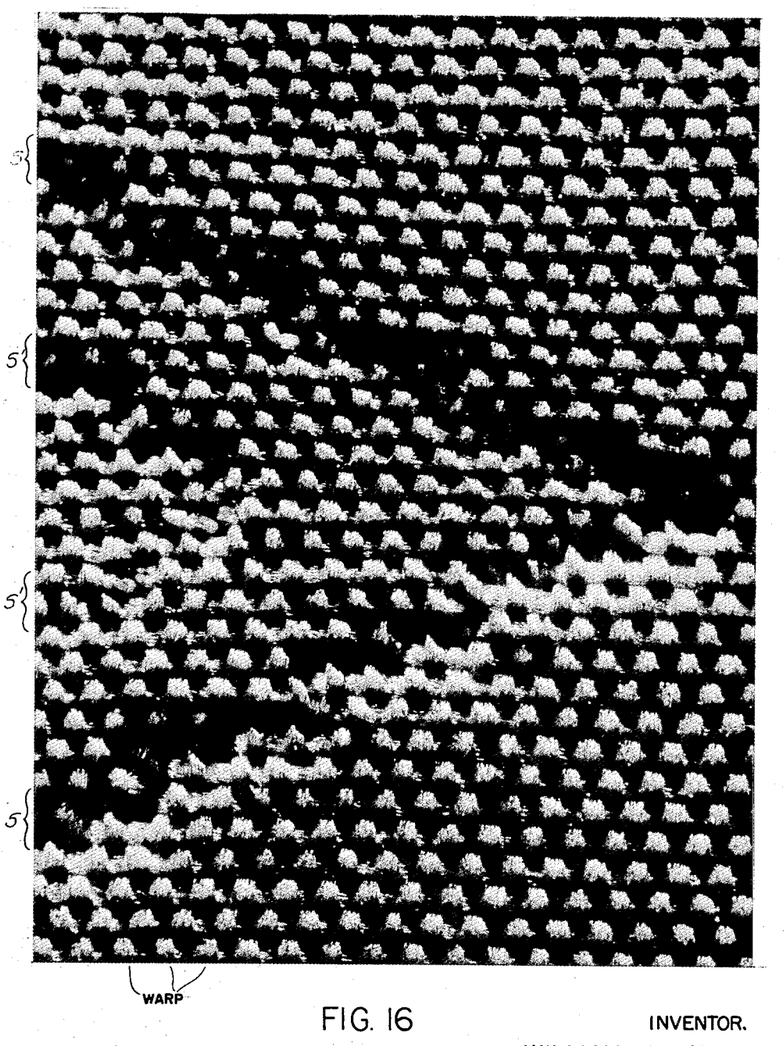
Fig. 16 is a similar photomicrograph of the area at the extreme point of a bifurcation such as in Figs. 3 and 7.

The foregoing structural characteristics of the wall-forming woven fabric of implants of the invention and as resulting from the method thereof are further demonstrated by the photomicrographic views Figs. 15 and 16. These 30× magnifications of actual examples of the woven fabric devices, taken in reflected light.

Fig. 15 shows a short length of one inclined marginal portion of an implant, before cutting out from the blank, as for example at any point along the upper margin of the lower leg 22 of the Y-form device of Fig. 3. The closeness of weave and the positive interlocking of warp ends and fillings is clearly evident, also the minutely stepped character of the seam formation. In this particular instance the progression fillingwise is by groups of four warp ends of each set, with the seam-forming cross-overs occurring after every second pick.

Fig. 16 strikingly demonstrates the structure developed at a bifurcation point such as described in connection with Figs. 3, 10 and 11. It is taken at similar magnification as Fig. 15, in reflected light, looking down at the point as seen on the face of the fabric. The warp runs lengthwise of the view, in the direction from top to bottom of the drawing sheet. The structural definiteness of the bifurcation point, the initial positive interlocking of the constituent warp ends and fillings, and the closeness of the fabrication are clearly seen. The minute interstices of the fabric, scarcely visible even on this intermediate scale of magnification, are uniform throughout and no larger anywhere in the region of stem and leg joinder at and in the vicinity of the bifurcation point than elsewhere in the fabric body. The determined restricted porosity is thus substantially uniform over the entirety of any given implant whether of the bifurcate, the straight, the shunt-type or other form.

The same manufacturing methods and structural principles, and the characteristics as to yarn composition, structure and size, fineness of weave and the others as herein disclosed apply also to the by-pass or shunt form of implant 30 of the further invention embodiment of Figs. 2 and 6.

In this instance the implant units 30 of the multiplicity as contained in the fabricated web blank of Fig. 2 are individually demarked and somewhat spaced one from another, as in the bifurcate example of Fig. 3. Each comprises a straight main tubular portion T with offsets or elbows E, E at the respective ends. These are shown as of like offset length and direction but for some uses may differ from each other in those respects. Noting also Fig. 5 these shunt units 30 as in the other forms are defined by woven-in seams S and S', at the respective longitudinal sides of the non-straight lumen. These seams are built into the fabric by interlocking warp ends and fillings at the proper locations conformant to the tubing configuration desired, again accomplished by reversing or "crossing over" certain warp ends of the respective warp sets A and B, by the weaving method and means already described.

In the elbow offsets or turned end portions E, E, Fig. 2, the seam-forming cross-overs in progressing from the main straight tube portion T into an offset E occur at different but relatively closely spaced warp ends and with respect to different picks; also the number of warp ends and the corresponding length of filling involved in each cross-over decreases as the angle of inclination of the seam to the filling line increases.

Under the Jacquard control any desired incline of the seam lines may be had, whether straight as shown for the Y-form implants 20 or curvilinear as shown for the implants 30 of Figs. 2 and 6. The arcuate seam lines of the end portions E, including both the inner seams S and the next adjacent seams S' may as illustrated have radii of different lengths in the opposed margins of these offsets but preferably are substantially concentric and such that a uniform lumen diameter is maintained throughout, the seam lines at both margins merging tangentially into the adjoined main straight tubing section T.

In the Fig. 2 example but two woven-in seams S and S' are shown along each margin of the given tubing unit 30. Here the outer seams S', S' also define the cut-out line along which the two fabric plies are subjected to heat sealing in the step of cutting out the implant units 30 from the web blank. An additional seam line or special demarcation for cutting, such as the lines S$^c$ of the Fig. 1 blank common to adjoining straight implant units 10, is dispensed with in Fig. 2 but may be employed if desired. For economy of the woven fabric and reduction of scrap adjacent shunt-form units 30 of the multiple array are nested or interfitted positionally in the web blank, both warpwise and fillingwise, as shown in Fig. 2. Similar economical nesting of forms in the blank, to more pronounced extent, is shown in Fig. 3 as appropriate for the bifurcations 20. In the instance of the continuous straight implant forms 10 of Fig. 1, wherein the successive forms are marginally contiguous and have cut lines S$^c$ each common to two adjoined forms, the entirety of the fabric blank is utilized wholly without scrap.

The swatch of two-ply web blank shown in Fig. 2 represents approximately one pattern unit with respect to the Jacquard control, corresponding to the typical repeat-pattern as shown in Fig. 12 for the bifurcate implants 20. Such pattern unit is repeated across the web, fillingwise, as for instance four times in the mentioned example of the 50 in. web. In Fig. 9 there is shown schematically one Jacquard hook with 4-pattern double-scale index as appropriate for such weaving pattern arrangement, it being understood that the warp ends of the sets A and B are separately but similarly controlled in this respect. The same warp control principle may be applied in weaving the straight tubular forms of Fig. 1 for assistance in attaining the fineness and density of weave as herein concerned.

As evident from the foregoing, the lumen or bore diameter of the tubular implants of whatever configuration may be dimensioned as desired. In weaving a given run of the two-ply fabric, of indeterminate length warpwise, one selected size and shape of implant unit preferably is continued uniformly throughout the weave, but with appropriate Jacquard set up differing units may be produced in the same continuous web blank. Also in a given implant unit different parts may be of different size, as illustrated in connection with the bifurcate implants 20 of Figs. 3, 7 and 12. There the resultant tube at the stem 21 is shown as of larger diameter than in the legs 22, 22, these parts being proportioned and symmetrically arranged to provide for substantially equal division of the flow as it proceeds from the stem or aorta portion into the legs or iliac portions, as in the human system. In special cases, however, the legs may differ from each other in lumen diameter.

Turning now to Fig. 12 further steps in the manufacturing operation are there illustrated. After the woven fabric is doffed from the loom it is placed on a table or panel of illuminated ground glass, whereby the seam and cut lines are clearly displayed to the operator. In Fig. 12 a fabric area equivalent to one repeat-pattern is assumed to be laid out on such glass cutting table, a portion of which is indicated at 40 at the lower left. The individual tubular grafts, the bifurcate units 20 in this instance, are cut from the piece by means of a specially adapted electrically or otherwise heated cutting tool 45 preferably having a rather blunt working edge. In this operation the heated cutter 45 is caused to follow along the outer seam line of each individual unit, such as the seam and cut lines $S^c$ of Figs. 3 and 1 or the lines $S'$ of the Fig. 2 form, passing along the entire edge of the graft unit excepting only at the terminal lines transverse to the tubing lumen, that is, at the mouths of the tubes. There the cutting is done without sealing, as by shearing, so that the tube mouths are left unsealed and open for access.

The resulting graft units of whatever form are thus self-sealed or weld-sealed completely along the outer lateral margins in the entirety thereof, in addition to the structural unions at the inner woven-in seams S and S' and the sealing effected thereby. Preferably attendant on the cutting out and edge-sealing of the implants, or subsequently but before packaging, each tubing unit is caused to be inflated for test and inspection purposes, as by inserting or applying at a mouth of the unit the free end of an air pressure line, as represented at 50 in Fig. 12. Desirably also each unit is indelibly marked with non-contaminant and tissue-compatible material, as by numbering or otherwise labelling for individual identification, as indicated by the small dotted panel near the mouth of a Y-form stem 21 near the center of Fig. 3.

In further finishing the implant unit products are washed, rinsed, autoclaved to sterile condition and then sterile packaged individually or in duplicate pairs or other grouping arrangement as preferred. Thus they are suppliable to the hospital or surgeon in readiness for implantation.

Figure 13:
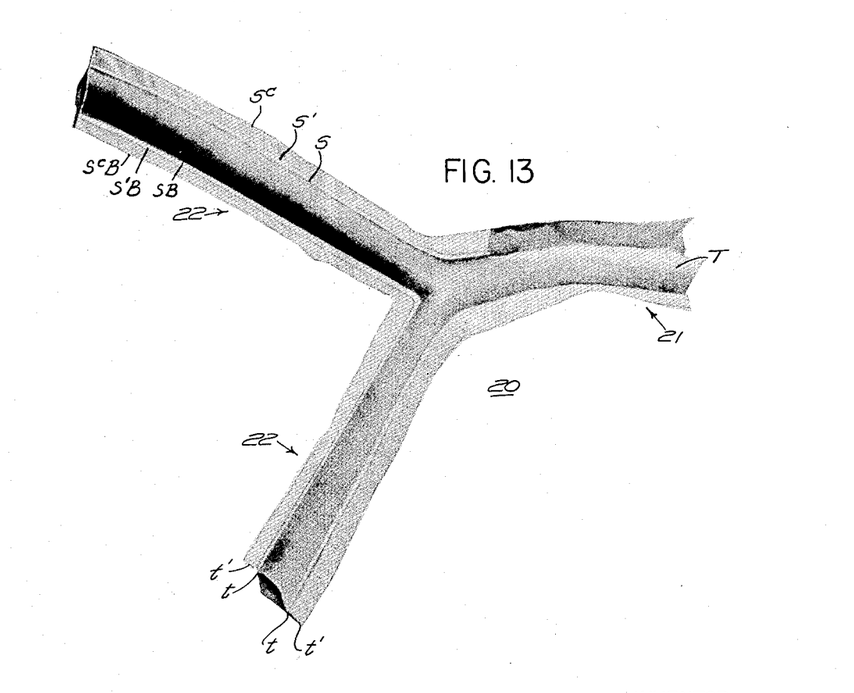
Fig. 13 is a photographic view of a two-branched or Y-form bifurcate unit shown held approximately in the position of implantation into a human body, namely in replacement of the lower aorta and adjoining iliac limbs.

As earlier pointed out herein the integrally woven implants of the invention, as represented by units 10, 20 and 30 herein, attain the desired restricted but positively available porosity, coupled with strength, flexibility and resilience, by utilizing selected multifilament synthetic yarns for at least one and preferably both of the warp and the filling elements, and in weaving them to a close-ness or density calculated with respect to the denier of the yarns. As apparent from the photographic view Fig. 13 of a resultant implant unit, of the bifurcate form in this example, the woven structure of the fabric plies is of such fineness as under casual observation is scarcely vissible to the unaided human eye.

Figure 17:
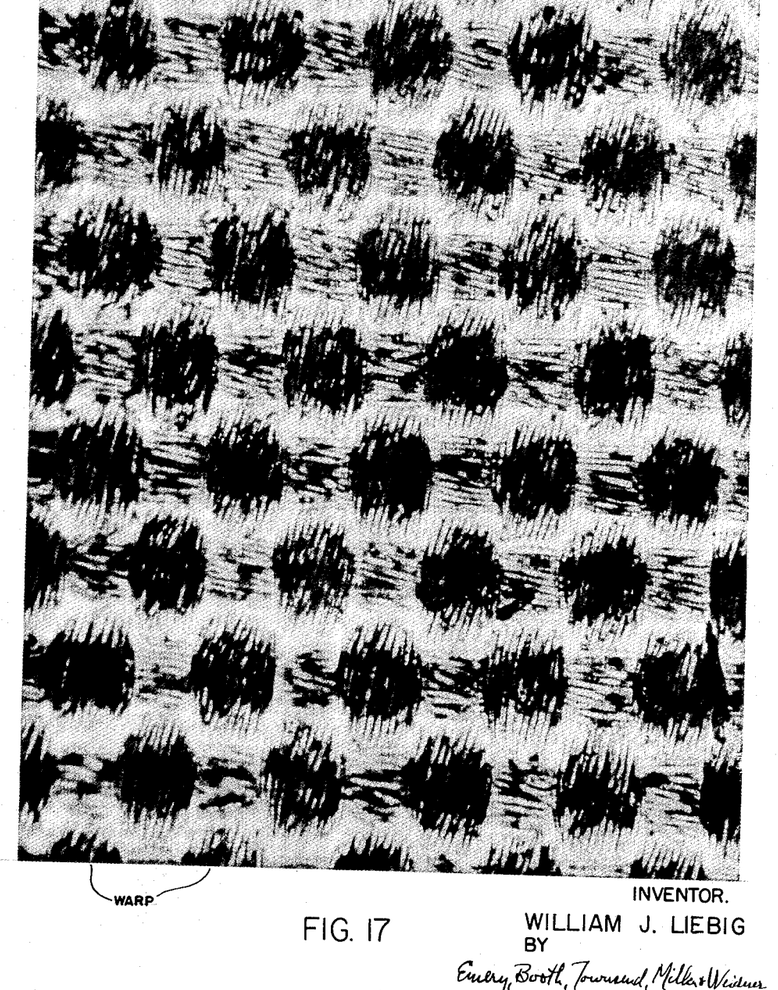
Fig. 17 is a photomicrograph at substantially higher magnification of 100× and taken under transillumination showing a small area of an implant embodying one example of the invention and in accordance with the method thereof.

This fine but yet tissue-permeable woven fabric structure, having a restricted porosity range of the order earlier herein stated, is further evident from consideration of the photomicrographic Figs. 15 and 16 taken at $\times 30$ mag. under reflected or surface illumination, and particularly by comparison thereof with the illustration in Fig. 17 taken at $\times 100$ mag. under transillumination, that is, with the light coming through the fabric ply from the side opposite to the observer. It should be borne in mind that these photomicrographic views represent but very small areas of the non-magnified fabric. Thus in Figs. 15 and 16 the actual area shown, containing a few over 30 warp ends by an approximate like number of filling picks, is but about 6.35 x 8.95 mm. or approximately 1/4 x 5/16 in. And under the still higher magnification in Fig. 17 the actual area seen is slightly less than 2.0 x 2.5 mm. or approximately .08 x .10 in. With this in mind the restricted character of the interspace between adjoined interwoven yarns and also between constituent filaments of a given yarn is clearly evident; also the overall uniformity of the fabric structure with reference to porosity or tissue-permeability at all locations therein including the woven-in seam zones shown in Figs. 15 and 16 and particularly at such vital regions as the extreme points of angular junction of seams at the points of the Y of the bifurcate implants, Fig. 16. At such regions hitherto unanswered difficulties of undue leakage and structural weakness have been encountered in vascular grafts.

Figure 18:
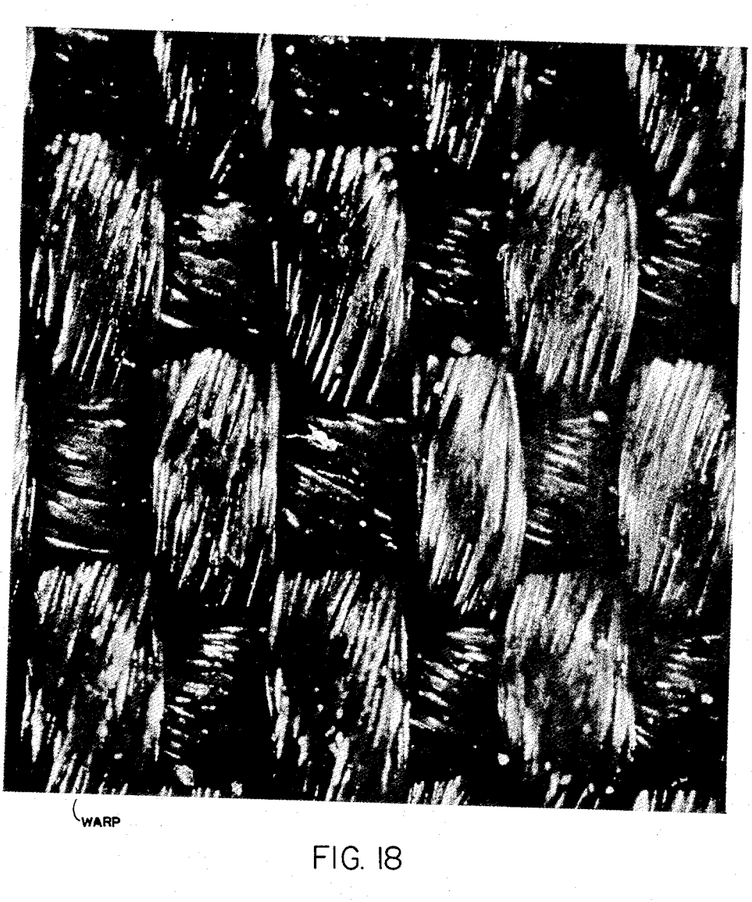
Fig. 18 is a photomicrograph similarly highly magnified as in Fig. 17 but in reflected light and showing a small area of an implant woven of a multi-filament Teflon yarn.

Fig. 18 upon a similar $\times 100$ mag. as in Fig. 17 and containing about the same actual fabric area filling-wise (across the sheet) and a trifle shorter warpwise illustrates an implant embodying the invention and in accordance with the method thereof wherein the yarns are of multifilament Teflon. These, while of the finest denier and filament size presently commercially available, are individually larger, both as to the yarns and the filaments. The resulting porosity is notably greater but is within a reasonably acceptable range. Also the fabric of this Teflon example is somewhat less flexible and resilient. A preferred embodiment accordingly comprises the multifilament Dacron yarns as described in the earlier example with reference to Figs. 1 to 17. It is to be understood however that other synthetic yarns of appropriate fine denier and the other requisite characteristics including tissue compatability and capacity to accept sterilization may be employed in accordance with the invention including not only Teflon but also nylon, also those known commercially under the name Orlon, as others that may satisfy the stated requirements.

In the fabrication of the plural-ply fabric blanks having the implant units woven into them under the Jacquard shedding control certain adaptations or modifications of the loom mechanism are found desirable, including the installation of a cloth tension bar in back of the hand rail and about at the line of the temples, shortly in front of the fell of the goods and fixed at a level to apply a hold-down tension on the cloth. Also the warp is let off and the cloth web is taken up under controlled tension. The multi-filament filling yarn is closely beaten up to result in the restricted inter-spaces scarcely visible to the naked eye. In the illustrated example of Figs. 1 to 17 utilizing a warp sheet of over 15,000 warp ends across a 50 in. web the "mesh" of the overall fabric web expressed in screening terms is of the order of 15,000, i.e. approximately that number of minute inter-yarn spaces per square inch, and substantially half that in each of the two fabric plies.

From the foregoing it is apparent that contributory factors in the method and products of the invention comprise not only the manner of fabrication and nature of the warp and filling web, as contrasted with knitting or braiding seamless tubes or with sewing together pieces of woven goods, but also in the character and size of the yarns. The woven-in and scarcely discernible seams have the same strength and porosity as the rest of the fabric, as distinguished from mere heat sealing and from stitch sewing. With this resultant uniformity as to strength and porosity and attendant adequate wall-resilience and flexibility the invention for the first time combines theoretically desirable factors of knitted or braided seamless tubes and of woven fabric folded and stitch-sewn together.

The several factors described have been the subject of extensive study in the development of the invention, and with particular reference to obtaining optimum results under exposure of the resultant synthetic vascular grafts to body fluids. After long continued and carefully observed testing in animals, these prosthetic vascular units have been clinically employed and found to perform successfully when implanted in humans.

It will be understood that my invention either as to product, means, or methods, is not limited to the exemplary embodiments or steps herein illustrated or described, and I set forth its scope in my following claims:

I claim:

1. A synthetic tubular vascular implant unit comprising a plurality of elongate fabric plies individually synchronously woven of transverse warp yarns and longitudinal filling yarns, the elongate fabric plies being integrally joined into an open-end tube by longitudinal woven-in sealing seams formed by warp crossings, said seams spaced in the warp direction according to the selected diameter and contour for the implant, and said fabric plies extending laterally beyond said seams and being there again sealingly interjoined along further lines of warp crossings paralleling the adjacent tube axis.

2. A synthetic vascular implant unit according to claim 1 having at least two such woven-in seams closely spaced in parallelism along the lateral margins of the implant unit.

3. A synthetic vascular implant unit according to claim 1 having a plurality of such woven-in seams at each lateral margin, the unit being severed along and the fabric plies thereof being fused together along an outer seam of each margin.

4. A synthetic vascular implant unit according to claim 1 having the fabric plies laterally external to a first seam at each longitudinal margin of the unit presenting lengthwise plural-sealed flexible fins aiding implant alignment.

5. A synthetic vascular implant unit comprising at least two co-extensive elongate fabric plies simultaneously individually woven of transverse warp yarns and longitudinal filling yarns and superposed as opposite wall portions of an initially flat tubular element elongate fillingwise and being formed along each longitudinal margin with a plurality of laterally spaced woven-in seams paralleling the tubing axis and uniting the fabric plies into inflatable tubular form of uniform weave density throughout.

6. A synthetic vascular implant unit according to claim 5 wherein the fabric plies are woven of multi-filament synthetic yarns.

7. A synthetic vascular implant unit according to claim 6 in which the yarns are of a terephthalic acid-ethylene glycol ester composition in the constituent filaments.

8. A synthetic vascular implant unit according to claim 7 in which the yarn fineness is of the order of about 70 denier.

9. A synthetic vascular implant unit according to claim 7 in which the yarns comprise at least about thirty continuous filaments.

10. A synthetic vascular implant unit according to claim 6 in which the constituent yarn filaments are of a tetrafluoroethylene composition.

11. A synthetic vascular implant unit according to claim 5 wherein the fabric fineness, density and porosity are as characterized by multifilament synthetic yarns of small denier such as to afford a weave density of the order of 150 warp ends x 100 filling picks per inch for each fabric ply.

12. A synthetic vascular implant comprising two flatwise juxtaposed fabric plies simultaneously woven of multi-filament synthetic yarn, elongate in the general direction of the filling, and integrally woven together along dual-ply zones, each of said zones containing a plurality of longitudinal lines of union sealingly uniting the woven plies into an inflatable flexible tube uniform throughout both in yarn structure and in weave density.

13. A synthetic vascular implant according to claim 12 integrally woven as two fabric plies with the dual-ply zones of interlocking warp and filling elements uniting them into a unitary Y-form tubing length comprising a central tubular stem with tubular branches diverging from an end thereof.

14. A synthetic vascular implant according to claim 12 in which the implant is a continuous straight tubular element.

15. A synthetic vascular implant according to claim 12 in which the implant has an integral laterally offset portion at one or both ends.

16. A synthetic vascular implant according to claim 12 in which the implant is of bifurcate form.

17. A vascular implant comprising an elongate tubular fabric unit having the tubular wall formed of fabric plies woven of transverse warp yarns and longitudinal filling yarns, the plies being interwoven to tubular form along diametrically opposite longitudinal plural-ply portions each presenting a plurality of closely adjacent parallel sealing lines of union each of which sealing lines is at least in part woven in.

18. A plural-ply woven textile blank presenting a multiplicity of unit areas adapted each to be divided one from another each to provide one or more vascular implants, said blank and areas comprising superposed woven fabric plies with dual-ply zones defined by plural and each at least partly woven-in lines of union, said zones outlining the respective unit areas and constituting them as generally fillingwise-extending inflatable tubular fabric elements with lumen from end to end thereof.

19. The method of fabricating synthetic vascular implants which comprises Jacquard weaving a two-ply fabric blank and in the course of the weaving forming pluralities of closely spaced seal lines of interlocking warp and filling defining dual-ply sealing zones along the axis-paralleling margins of initially flat tubular units in patterned array in the fabric blank and of determined dimension and configuration, and thereafter severing and fusing the blank between such zones of adjacent individual units to constitute said units as tubular implants each having plural marginal seal lines at the respective margins with each such seal line at least in part woven.

20. The method of making prosthetic vascular implants which comprises Jacquard weaving a double-ply fabric of warp and filling yarns, controlling the shedding and patterning to present in the fabric repeat series of fillingwise elongate tubular units consisting of flatwise juxtaposed main tubular areas with interposed dual-ply zones each containing a plurality of parallel sealing lines of union of the plies defined by cross-shedding of the warp, and thereafter severing said units each from the others between such zones of adjacent units and with such severing spaced by at least one such union line from the adjacent main tubular areas to each side of such severings and so as to present a multiplicity of individual tubular vascular implant units each with a plurality of sealing lines along diametrically opposite longitudinal margins thereof.

21. The method according to claim 20 including heat-sealing the longitudinal margins of the implant units attendant on the severance thereof.

22. The method of claim 19 together with the step of inflating the units individually.

23. Synthetic vascular implants consisting of fabric tubing integrally finely woven as two uniform and mutually duplicatory plies of warp and filling elements of fine denier multi-filament yarns selected from the class consisting of nylon, Dacron, Orlon and Teflon, the woven plies being longitudinally marginal sealed to each other into tubular form by pluralitities of adjacent in-woven lines of union along each longitudinal margin and by heat-sealing severance closely along an outer line of each of said pluralities of union lines.

24. A synthetic vascular implant unit according to claim 12 comprising a main tubular stem and a plurality of tubular legs similarly woven as the stem and branching therefrom with the lumens thereof open uninterruptedly from the stem lumen, the dual ply zones along the outer longitudinal margins of the legs extending in lineal continuation of and at an angle to such zones of the stem and the dual ply zones along the inner longitudinal margins of the legs extending in general parallelism to those of the outer margins thereof and themselves converging to substantially a point of uniformly woven union at the branching of the stem.

References Cited in the file of this patent

UNITED STATES PATENTS

| | | |
|---|---|---|
| 462,040 | Fox | Oct. 27, 1891 |
| 2,250,261 | Goldsmith | July 22, 1941 |
| 2,845,959 | Sidebotham | Aug. 5, 1958 |

FOREIGN PATENTS

| | | |
|---|---|---|
| 682,388 | Great Britain | Nov. 12, 1952 |

OTHER REFERENCES

"Surgery," published by C. V. Mosby Co., St. Louis, Mo., vol. 37, pp. 167 to 174 (1955). (Copy in Patent Office Library.)

"Surgery," published by C. V. Mosby Co., St. Louis, Mo., vol. 38, pp. 71 to 87 (1955). (Copy in Patent Office Library.)